US012647984B2

(12) United States Patent
Guo et al.

(10) Patent No.: US 12,647,984 B2
(45) Date of Patent: Jun. 2, 2026

(54) REPETITION IN A CONFIGURED GRANT

(71) Applicant: QUALCOMM Incorporated, San Diego, CA (US)

(72) Inventors: Shaozhen Guo, Beijing (CN); Jing Sun, San Diego, CA (US); Changlong Xu, Beijing (CN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 688 days.

(21) Appl. No.: 18/000,990

(22) PCT Filed: Jul. 22, 2020

(86) PCT No.: PCT/CN2020/103495

§ 371 (c)(1),
(2) Date: Dec. 7, 2022

(87) PCT Pub. No.: WO2022/016414

PCT Pub. Date: Jan. 27, 2022

(65) Prior Publication Data

US 2023/0217447 A1     Jul. 6, 2023

(51) Int. Cl.
H04W 72/21       (2023.01)
H04L 1/08        (2006.01)
H04L 1/1867      (2023.01)

(52) U.S. Cl.
CPC .............. H04W 72/21 (2023.01); H04L 1/08 (2013.01); H04L 1/189 (2013.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54;

(Continued)

(56) References Cited

U.S. PATENT DOCUMENTS 11,470,587 B2 * 10/2022 Bae ....................... H04L 5/0082
2019/0053211 A1    2/2019 Ying et al.
2020/0404655 A1 * 12/2020 Salem ............... H04W 72/0446

FOREIGN PATENT DOCUMENTS

CN          109429251 A     3/2019
WO       2019207488 A1    10/2019
WO       2020089869 A1     5/2020

OTHER PUBLICATIONS

International Search Report and Written Opinion—PCT/CN2020/103495—ISA/EPO—Mar. 16, 2021.

* cited by examiner

*Primary Examiner* — Bo Hui A Zhu

(74) *Attorney, Agent, or Firm* — Harrity & Harrity, LLP \ Qualcomm

(57)                    ABSTRACT

Various aspects of the present disclosure generally relate to wireless communication. In some aspects, a user equipment (UE) may determine resources of a configured grant that are to be used for transmitting repetitions of one or more transport blocks based at least in part on at least one of a quantity of consecutive slots indicated for the configured grant or a quantity of consecutive physical uplink shared channel occasions per slot indicated for the configured grant. The UE may transmit the repetitions of the one or more transport blocks in the determined resources of the configured grant. Numerous other aspects are provided.

46 Claims, 13 Drawing Sheets

(58) Field of Classification Search
CPC ............. H04W 72/541; H04W 72/542; H04W
72/543; H04W 72/56
See application file for complete search history.

600

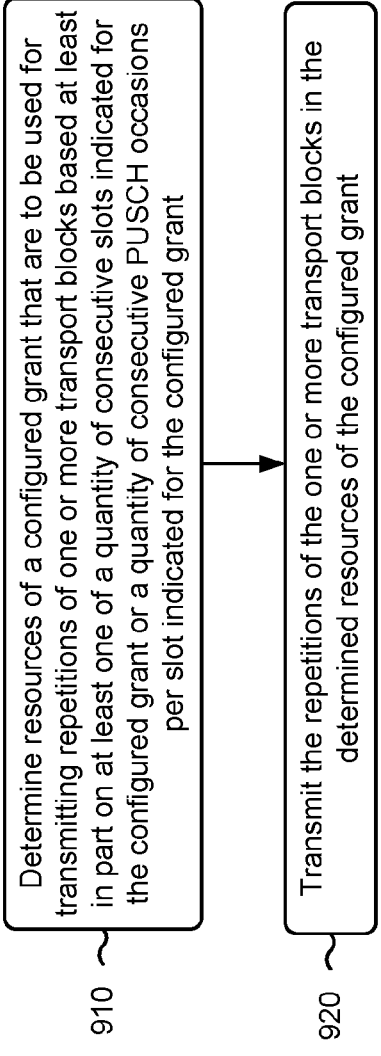

Determine resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant

910

Transmit the repetitions of the one or more transport blocks in the determined resources of the configured grant

920

900

FIG. 9

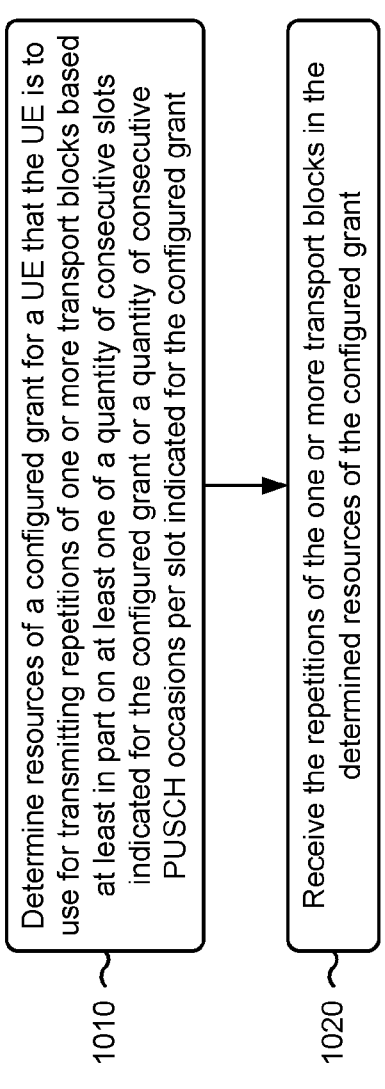

1000

1010 — Determine resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant 1020 — Receive the repetitions of the one or more transport blocks in the determined resources of the configured grant

FIG. 10

REPETITION IN A CONFIGURED GRANT

CROSS-REFERENCE TO RELATED APPLICATION

This application is a 371 national stage of Patent Cooperation Treaty (PCT) Application No. PCT/CN2020/103495 filed on Jul. 22, 2020, entitled "REPETITION IN A CONFIGURED GRANT," which is hereby expressly incorporated by reference herein.

FIELD OF THE DISCLOSURE

Aspects of the present disclosure generally relate to wireless communication and to techniques and apparatuses for repetition in a configured grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining resources of a configured grant that are to be used for transmitting repetitions of one or more transport blocks based at least in part on at least one of a quantity of consecutive slots indicated for the configured grant or a quantity of consecutive physical uplink shared channel (PUSCH) occasions per slot indicated for the configured grant; and transmitting the repetitions of the one or more transport blocks in the determined resources of the configured grant.

In some aspects, a method of wireless communication performed by a base station includes: determining resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant; and receiving the repetitions of the one or more transport blocks in the determined resources of the configured grant.

In some aspects, a UE for wireless communication includes: a memory; and one or more processors operatively coupled to the memory, the memory and the one or more processors configured to: determine resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant; and transmit the repetitions of the one or more transport blocks in the determined resources of the configured grant.

In some aspects, a base station for wireless communication includes: a memory; and one or more processors operatively coupled to the memory, the memory and the one or more processors configured to: determine resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant; and receive the repetitions of the one or more transport blocks in the determined resources of the configured grant.

In some aspects, a non-transitory computer-readable medium storing a set of instructions for wireless communication includes: one or more instructions that, when executed by one or more processors of a UE, cause the UE to: determine resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant; and transmit the repetitions of the one or more transport blocks in the determined resources of the configured grant.

In some aspects, a non-transitory computer-readable medium storing a set of instructions for wireless communication includes: one or more instructions that, when executed by one or more processors of a base station, cause the base station to: determine resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant; and receive the repetitions of the one or more transport blocks in the determined resources of the configured grant.

In some aspects, an apparatus for wireless communication includes: means for determining resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant; and means for transmitting the repetitions of the one or more transport blocks in the determined resources of the configured grant.

In some aspects, an apparatus for wireless communication includes: means for determining resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant; and means for receiving the repetitions of the one or more transport blocks in the determined resources of the configured grant.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes associated with repetition in a CG, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
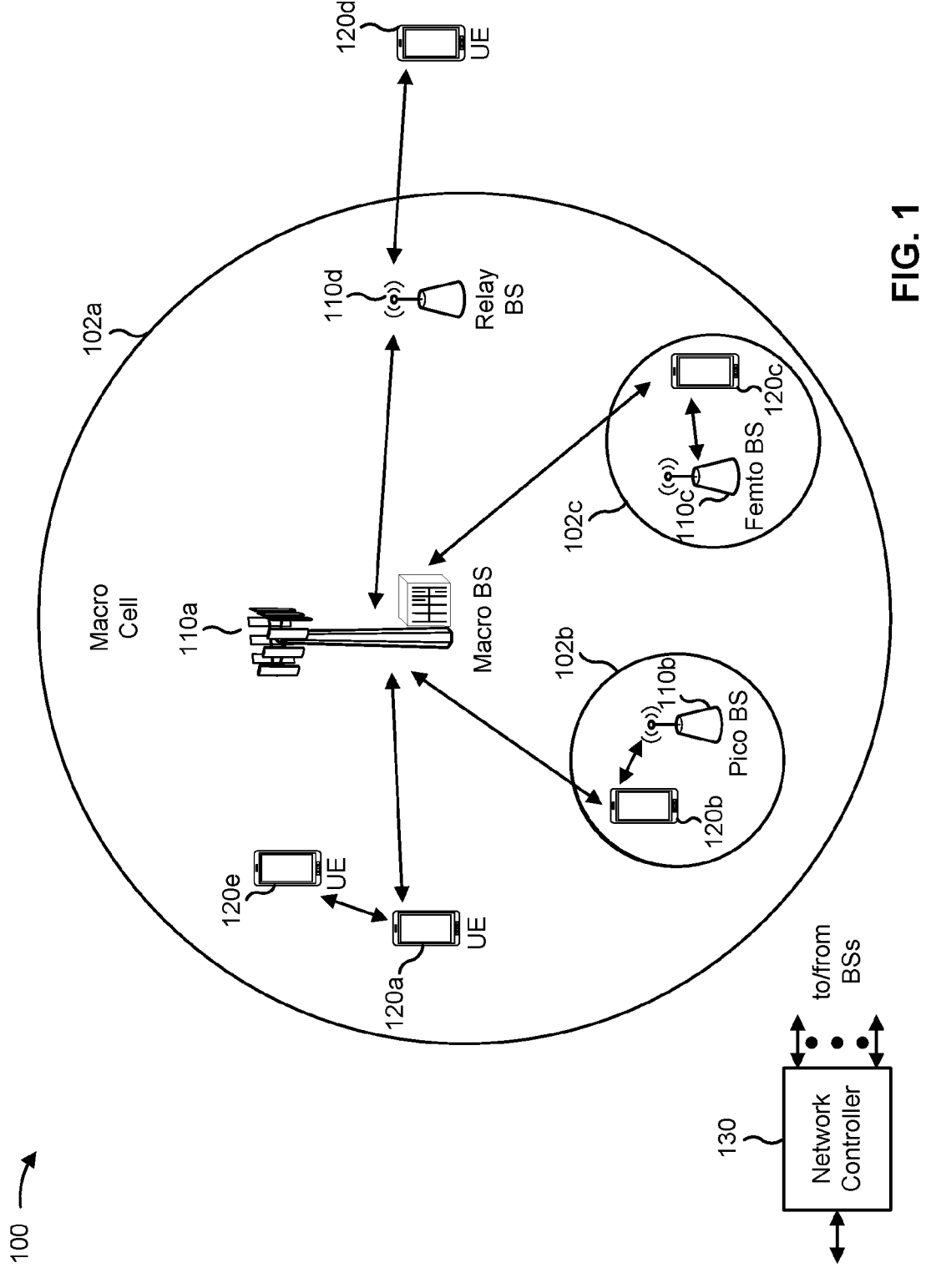
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
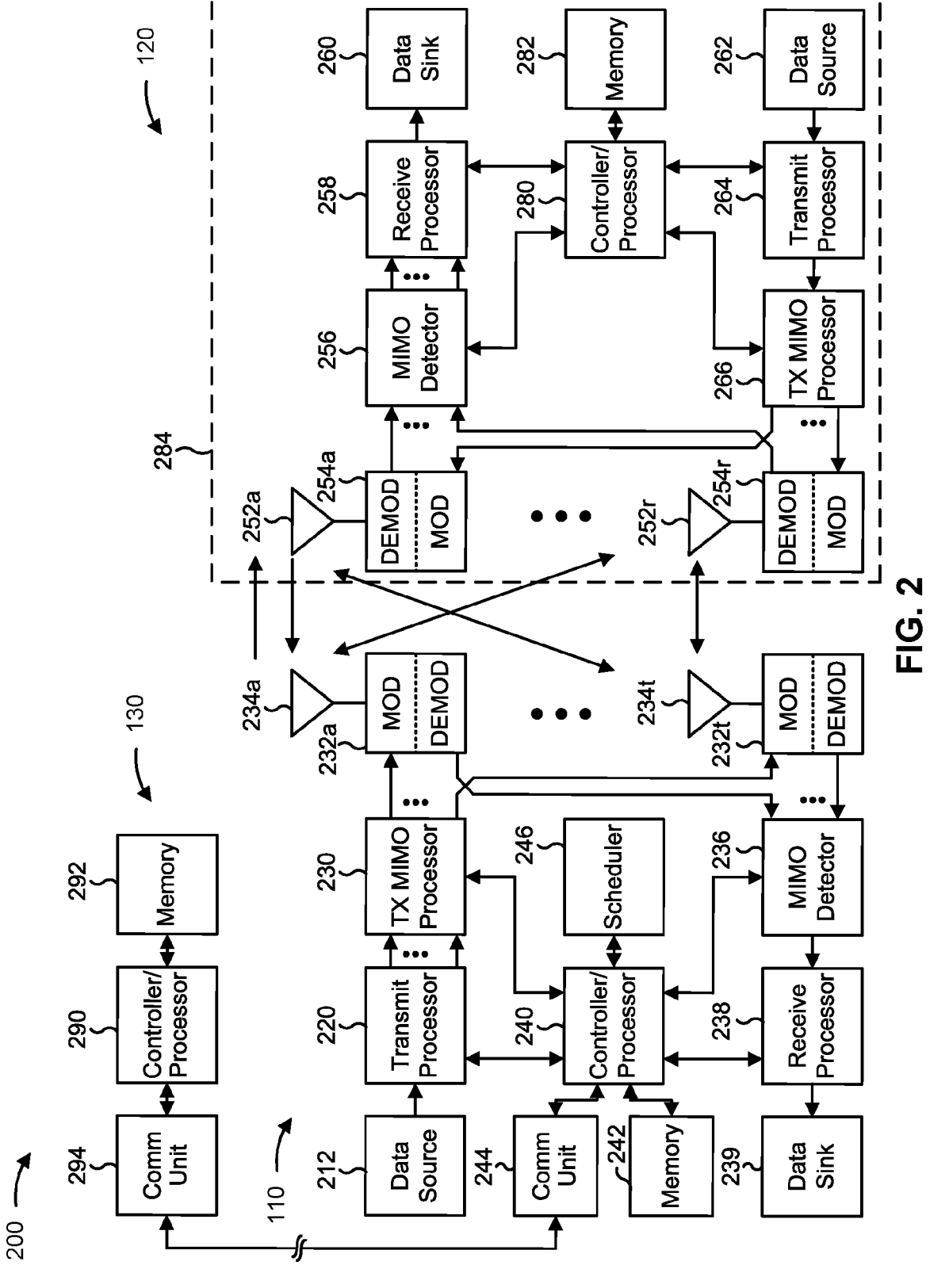
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5, 6, 7A-7C, 8A, 8B, 9, and 10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5, 6, 7A-7C, 8A, 8B, 9, and 10.

Controller/processor 240 of base station 110, controller/processor 280 of UE 120, and/or any other component(s) of FIG. 2 may perform one or more techniques associated with repetition in a configured grant (CG), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like.

In some aspects, UE 120 may include means for determining (e.g., using receive processor 258, transmit processor 264, controller/processor 280, memory 282, and/or the like) resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant, means for transmitting (e.g., using controller/processor 280, transmit processor 264, TX MIMO processor 266, MOD 254, antenna 252, and/or the like) the repetitions of the one or more transport blocks in the determined resources of the configured grant, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining (e.g., using transmit processor 220, receive processor 238, controller/processor 240, memory 242, and/or the like) resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant, means for receiving (e.g., using antenna 234, DEMOD 232, MIMO detector 236, receive processor 238, controller/processor 240, and/or the like) the repetitions of the one or more transport blocks in the determined resources of the configured grant, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
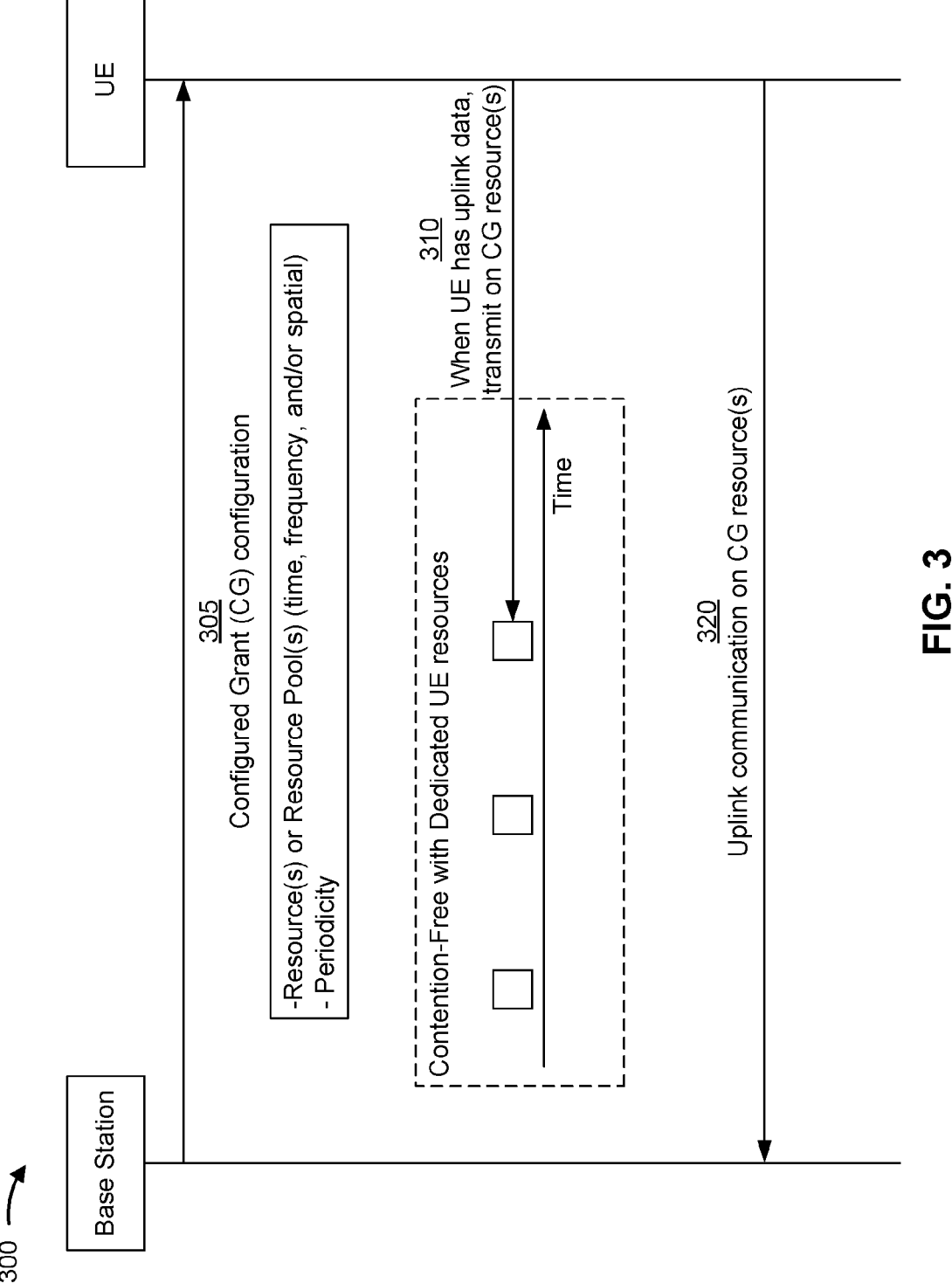
FIG. 3 is a diagram illustrating an example of configured grant (CG) communication, in accordance with various aspects of the present disclosure.

FIG. 3 is a diagram illustrating an example 300 of configured grant (CG) communication, in accordance with various aspects of the present disclosure. As shown, example 300 includes a base station and a UE.

As shown in FIG. 3, and by reference number 305, the base station may transmit a CG configuration to the UE. For example, the base station may transmit configuration information (e.g., in a radio resource configuration (RRC) message, in a downlink control information (DCI) message, and/or the like) that identifies the CG. In some aspects, the configuration information identifying the CG may indicate a resource allocation (e.g., in a time domain, frequency domain, spatial domain, code domain, and/or the like), a periodicity associated with the resource allocation, and/or the like. The CG may identify a resource or set of resources available to the UE for transmission of an uplink communication (e.g., data, control information, and/or the like). For example, the CG configuration may identify a resource allocation for a physical uplink shared channel (PUSCH). In some aspects, the CG configuration may identify a resource pool or multiple resource pools that may be available to the UE for an uplink transmission.

In some aspects, the CG configuration may configure contention-free CG communication with resources dedicated for the UE to transmit uplink communications. In this case, the CG configuration may indicate a resource allocation (e.g., in a time domain, frequency domain, spatial domain, code domain, and/or the like) dedicated for the UE to use to transmit uplink communications. In some aspects, the CG configuration may configure the resource allocation for the UE to occur periodically, such that the resource allocation corresponds to periodically occurring transmission time occasions. As shown in FIG. 3, and by reference number 310, when the UE has uplink data to transmit, the UE transmits the uplink data in the CG resources identified by the CG configuration. For example, the UE transmits the uplink data in one of the CG uplink occasions identified in the CG configuration using the configured resource allocation. A CG configuration with regular periodic CG uplink occasions with a dedicated resource allocation for the UE may be convenient for a UE with periodic uplink traffic. The CG configuration may configure the periodicity associated with the resource allocation to associate CG uplink occasions with periodic nominal arrival times at which traffic to be transmitted to the base station is expected to arrive at (or be ready to be transmitted by) the UE.

As further shown in FIG. 3, and by reference number 320, the UE transmits the uplink communication to the base station on the CG resource. For example, the UE may transmit the uplink communication as a PUSCH communication using a resource allocation identified by the CG.

In this way, the base station may schedule uplink data transmissions for the UE without uplink grants (e.g., without DCI grants). As described above, a configuration for a CG (e.g., ConfiguredGrantConfig) may be a semi-static configuration (e.g., an RRC configuration). In some aspects, a configuration for a CG may be activated (or deactivated) by DCI.

In a first type of CG configuration, referred to as a Type 1 CG configuration (e.g., an RRC-based CG configuration), a UE can perform uplink data transmission without a grant based at least in part on RRC (re)configuration without any Layer 1 (L1) signaling. In a second type of CG configuration, referred to as a Type 2 CG configuration (e.g., a DCI activation-based CG configuration), a UE can perform uplink data transmission without a grant based at least in part on RRC (re)configuration in combination with L1 signaling to activate and/or release the Type 2 CG configuration. CG communication according to a Type 1 CG configuration or a Type 2 CG configuration may be referred to as Release 15 CG-UL.

A Type 1 CG configuration may indicate a configured scheduling radio network temporary identifier (CS-RNTI), which may be used for receiving DCI that schedules a retransmission. The Type 1 CG configuration may indicate a periodicity of the CG. The Type 1 CG configuration may indicate a time domain offset (e.g., timeDomainOffset) that indicates an offset of the CG resource in a time domain (e.g., with respect to system frame number 0 (SFN=0)). The Type 1 CG configuration may indicate a time domain allocation (e.g., timeDomainAllocation) that indicates the configured uplink grant in the time domain. For example, the time domain allocation may include an indication of a starting symbol and a length (e.g., a start and length indicator value (SLIV)). As an example, a time domain allocation parameter of the Type 1 CG configuration may indicate a value (m) that indicates a row index (m+1) of a time domain resource allocation table (which indicates the SLIV). The Type 1 CG configuration may indicate a quantity of hybrid automatic repeat request (HARQ) processes (e.g., nrofHARQ-Processes) for the CG.

A Type 2 CG configuration may indicate a CS-RNTI, which may be used for receiving DCI that activates the Type 2 CG configuration, deactivates the Type 2 CG configuration, and/or schedules a retransmission. The Type 2 CG configuration may indicate a periodicity of the CG. The Type 2 CG configuration may indicate a quantity of HARQ processes (e.g., nrofHARQ-Processes) for the CG. For a Type 2 CG configuration, L1 signaling may indicate additional parameters for the CG resource, such as a time offset associated with the periodicity. For example, a time domain resource allocation field in DCI may indicate a row index of a time domain resource allocation table (which indicates a SLIV). In addition, for a Type 2 CG configuration, a UE may transmit an acknowledgment (e.g., in a medium access control control element (MAC-CE)) for L1 signaling that activates or deactivates the Type 2 CG configuration.

In some cases, a Type 1 CG configuration or a Type 2 CG configuration may indicate an enhanced time domain resource allocation (e.g., relative to Release 15 CG-UL). For example, a CG configuration may indicate a quantity of consecutive slots that are allocated for a CG resource in a period of the CG. The consecutive slots may begin from a slot offset indicated by the CG configuration. As another example, a CG configuration may indicate a quantity of consecutive PUSCH occasions in a slot (i.e., per slot). A length (e.g., a time duration) of each PUSCH occasion may be the same. For example, a SLIV of the CG configuration may indicate a starting symbol and a length for a first PUSCH occasion in a slot, and the indicated length may be repeated for consecutive PUSCH occasions in the slot. Moreover, a time domain resource assignment of the CG configuration may repeat over the indicated quantity of consecutive slots, and the same symbol allocation and mapping type may be used for a first PUSCH occasion in each slot of the consecutive slots. The enhancements to the time domain resource allocation may be useful for communication in NR unlicensed (NR-U) spectrum, and may be referred to as Release 16 NR-U CG-UL enhancements.

In some aspects, a UE may transmit uplink control information (UCI) relating to the CG (which may be referred to as CG-UCI) in each PUSCH transmission of the CG. The CG-UCI may indicate a HARQ process identifier associated with the PUSCH transmission, a new data indication for the PUSCH transmission, a redundancy version associated with the PUSCH transmission, and/or the like. The CG-UCI also may indicate channel occupancy time (COT) sharing information.

As indicated above, FIG. 3 is provided as an example. Other examples may differ from what is described with respect to FIG. 3.

Figure 4:
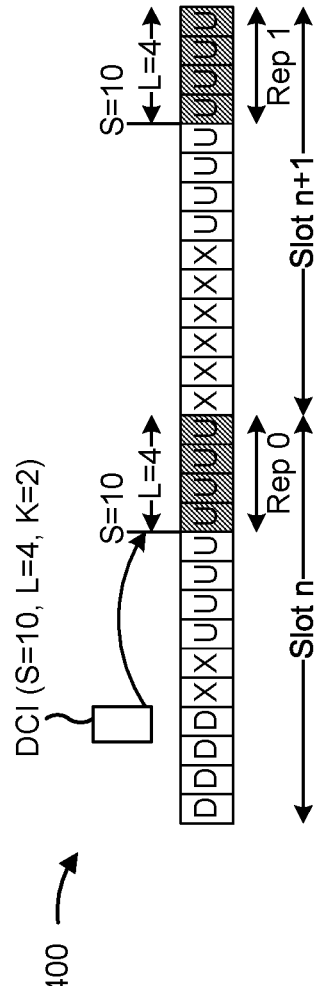
FIG. 4 is a diagram illustrating examples of physical uplink shared channel (PUSCH) repetition, in accordance with various aspects of the present disclosure.
Figure 4:
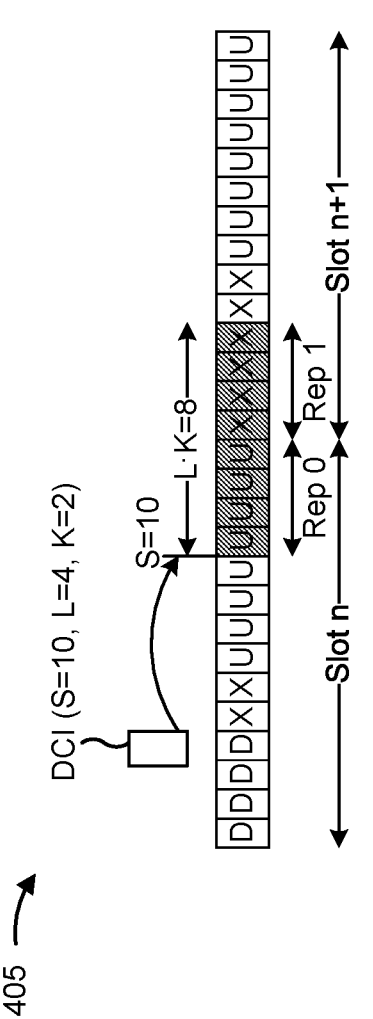

FIG. 4 is a diagram illustrating examples 400 and 405 of PUSCH repetition, in accordance with various aspects of the present disclosure. In particular, examples 400 and 405 are examples of different types of PUSCH repetition, which may be used for dynamic grants or CGs. The different types of PUSCH repetition of examples 400 and 405 may be used for ultra-reliable low-latency communication (URLLC). In some aspects, PUSCH repetitions may be defined according to a SLIV, which indicates a starting symbol (S) for a repetition and a length (L) of a repetition (e.g., a quantity of symbols for a repetition), and a quantity of repetitions (K).

Example 400 is an example of PUSCH repetition Type A. In PUSCH repetition Type A, the same SLIV may be used for each repetition in a slot across K consecutive slots (e.g., when K>1). PUSCH repetition Type A may use dynamic indication of the quantity of repetitions.

Example 405 is an example of PUSCH repetition Type B. In PUSCH repetition Type B, K nominal repetitions, each repetition having a nominal length L, are transmitted back-to-back (e.g., without a time gap between the repetitions) starting from symbol S, where S and L are indicated by a SLIV. In PUSCH repetition Type B, the quantity of repetitions is referred to as a quantity of nominal repetitions and a length of a repetition is referred to as a nominal length, because an actual quantity of repetitions that are transmitted or an actual length of a repetition that is used may differ from the indicated quantity of nominal repetitions or the indicated nominal length of a repetition. PUSCH repetition Type B may support repetitions within a single slot, repetitions across multiple slots, a repetition that crosses a slot boundary, dynamic indication of the quantity of repetitions, inter-nominal PUSCH frequency hopping, a new scheme for uplink/downlink symbol interaction, a new type of SLIV, segmentation of a repetition that crosses a slot boundary, segmentation of a repetition in a downlink symbol or an invalid symbol, and/or the like.

Current wireless networks generally lack support for PUSCH repetition Type A or Type B in connection with the CG time domain resource allocation enhancements described above (i.e., the Release 16 NR-U CG-UL enhancements). That is, wireless networks generally lack support for PUSCH repetition Type A or Type B in connection with a CG configuration (e.g., a Type 1 CG configuration or a Type 2 CG configuration) that indicates a quantity of consecutive slots for a CG resource and/or indicates a quantity of consecutive PUSCH occasions in a slot. In such cases, the CG configuration also may indicate a SLIV for a first PUSCH occasion in a slot and a quantity of repetitions that are to be transmitted across consecutive slots (for Type A) or across consecutive nominal repetitions (for Type B), thereby adding further complexity to supporting PUSCH repetition Type A or Type B.

Some techniques and apparatuses described herein provide support for PUSCH repetition Type A or Type B in connection with the CG time domain resource allocation enhancements. That is, some techniques and apparatuses described herein provide support for PUSCH repetition Type A or Type B in connection with a CG configuration (e.g., a Type 1 CG configuration or a Type 2 CG configuration) that indicates a quantity of consecutive slots for a CG resource and/or indicates a quantity of consecutive PUSCH occasions in a slot. In this way, PUSCH repetition for URLLC can be supported in NR-U spectrum.

As indicated above, FIG. 4 is provided as an example. Other examples may differ from what is described with respect to FIG. 4.

Figure 5:
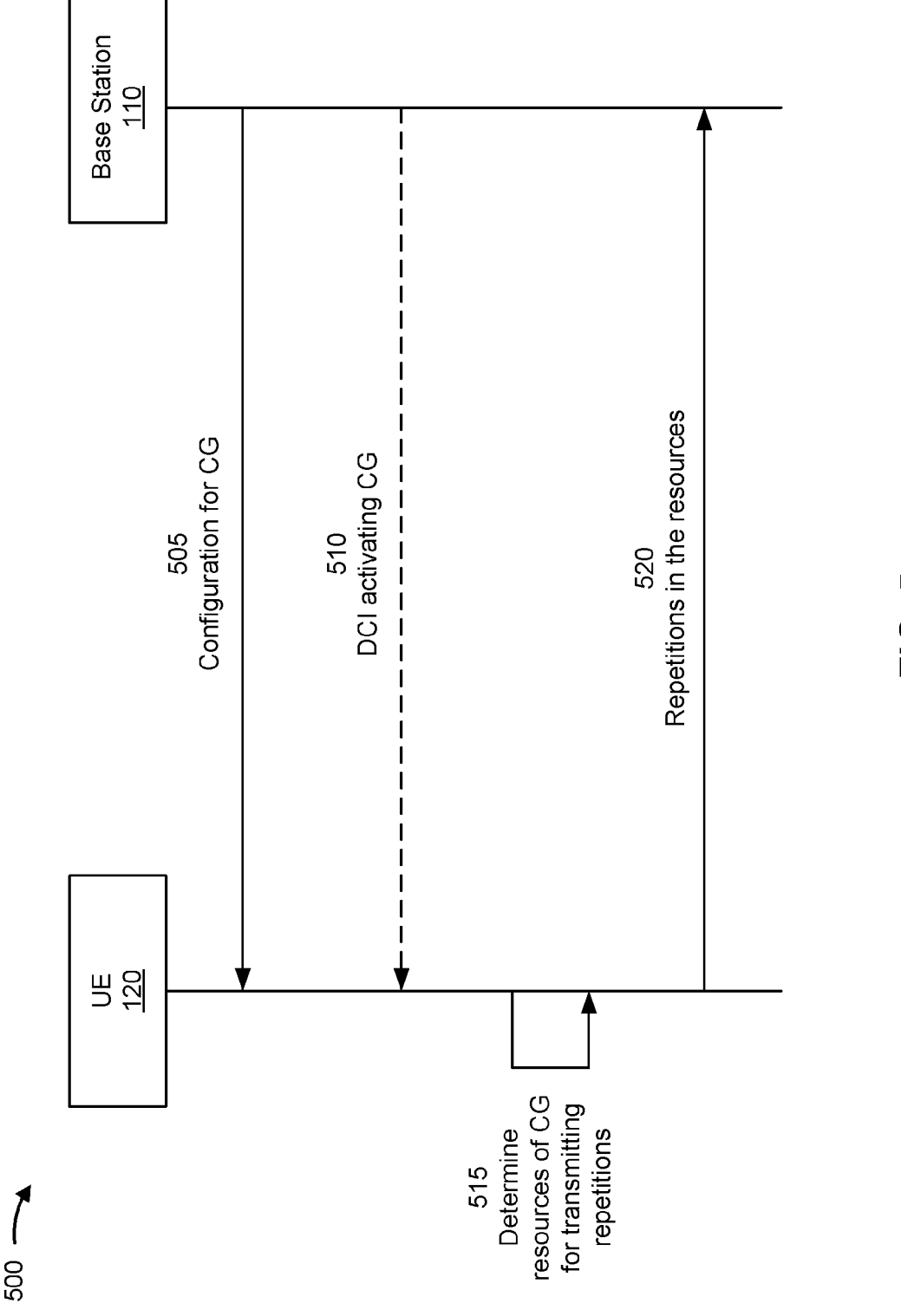
FIG. 5 is a diagram illustrating an example associated with repetition in a CG, in accordance with various aspects of the present disclosure.

FIG. 5 is a diagram illustrating an example 500 associated with repetition in a CG, in accordance with various aspects of the present disclosure. As shown in FIG. 5, example 500 includes communication between a base station 110 and a UE 120. The base station 110 and the UE 120 may be included in a wireless network, such as wireless network 100 illustrated and described above in connection with FIG. 1. The base station 110 and the UE 120 may communicate on a wireless access link, which may include an uplink and a downlink.

In some aspects, the base station 110 and the UE 120 may communicate in connection with URLLC. For example, the UE 120 may perform URLLC transmissions in connection with a URLLC service. In some aspects, the base station 110 and the UE 120 may operate in an unlicensed spectrum, such as an NR-U spectrum.

As shown in FIG. 5, and by reference number 505, the base station 110 may transmit, and the UE 120 may receive, a configuration for a CG. For example, the configuration for the CG may be a Type 1 CG configuration or a Type 2 CG configuration, as described above. In some aspects, the CG may be in an NR-U frequency band. In some aspects, the CG may be for uplink transmissions of the UE 120 in a PUSCH.

In some aspects, the configuration for the CG may indicate a quantity of consecutive slots (e.g., in a CG period) for the CG, indicate a quantity of consecutive PUSCH occasions per slot of the CG, and/or the like. The quantity of consecutive slots for the CG may define a CG resource. In some aspects, the configuration for the CG may indicate a starting symbol and a length value (e.g., a SLIV) for a first PUSCH in a slot, a quantity of repetitions across consecutive slots or across consecutive nominal repetitions, and/or the like. In some aspects, the UE 120 may receive a configuration (e.g., an RRC configuration) for a default quantity of repetitions (which may be referred to as a repK value) that is to be used by the UE 120.

As shown by reference number 510, in some aspects, the base station 110 may transmit, and the UE 120 may receive, DCI that activates the CG. For example, if the configuration for the CG is a Type 2 CG configuration, then the base station 110 may transmit DCI that activates the CG. In some aspects, the activation DCI may indicate a starting symbol and a length value (e.g., a SLIV) for a first PUSCH in a slot, a quantity of repetitions across consecutive slots or across consecutive nominal repetitions, and/or the like.

As shown by reference number 515, the UE 120 may determine resources of the CG for transmitting repetitions of one or more transport blocks (e.g., one or more uplink communications). In some aspects, the UE 120 may determine the resources of the CG for transmitting the repetitions based at least in part on whether the repetitions are Type A repetitions or Type B repetitions, as described above. In this case, the UE 120 may be configured to perform one of Type A repetition or Type B repetition for the one or more transport blocks. In some aspects, the UE 120 may determine the resources of the CG for transmitting the repetitions based at least in part on the quantity of consecutive slots configured for the CG and/or the quantity of consecutive PUSCH occasions per slot configured for the CG.

In some aspects, the UE 120 may determine the resources of the CG for transmitting the repetitions as described below in connection with FIGS. 6, 7A, 7B, 7C, 8A, and/or 8B. In some aspects, the base station 110 may determine the resources of the CG in which the UE 120 is to transmit the repetitions of the one or more transport blocks in a manner similar to that described herein for the UE 120.

As shown by reference number 520, the UE 120 may transmit, and the base station may receive, the repetitions of the one or more transport blocks in the determined resources of the CG. For example, the UE 120 may transmit the repetitions in transmission occasions of the CG resource. "Transmission occasion" may refer to one or more symbols of the CG resource in which a single repetition is to be transmitted. In some cases, a transmission occasion may also be referred to as a PUSCH allocation, a PUSCH occasion, a CG-PUSCH, and/or the like.

In some aspects, the UE 120 may determine when transmission of the repetitions is to begin. For example, the UE 120 may perform a listen-before-talk procedure (e.g., in NR-U spectrum) in order to determine when transmission of the repetitions is to begin. In some aspects, the UE 120 may transmit CG-UCI (e.g., indicating a redundancy version) with the repetitions of the one or more transport blocks, as described above.

In some aspects, the UE 120 may transmit Type B repetitions with segmentation of the repetitions over downlink symbols, invalid symbols, and/or the like. However, FIGS. 7A-7C, 8A, and 8B below are described without regard to such segmentation of the repetitions.

As indicated above, FIG. 5 is provided as an example. Other examples may differ from what is described with respect to FIG. 5.

Figure 6:
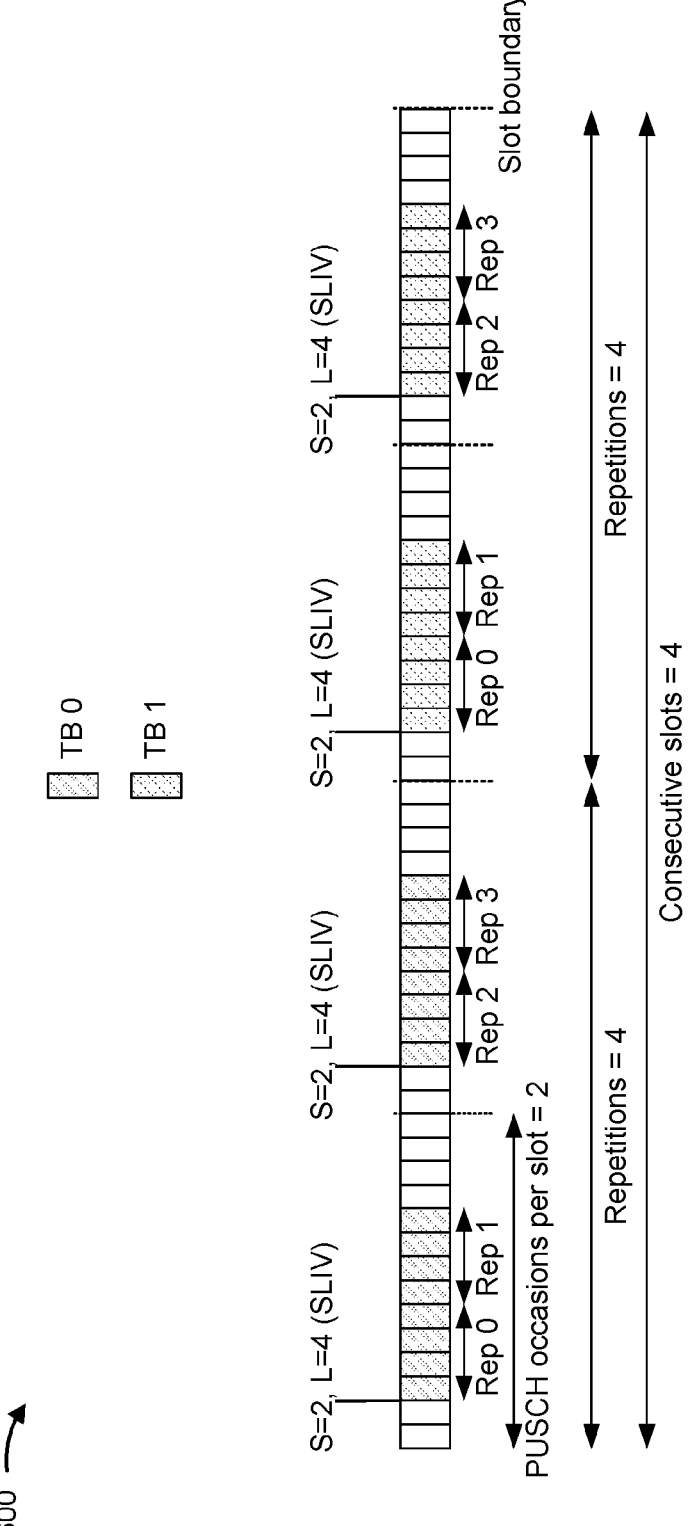
FIG. 6 is a diagram illustrating an example associated with repetition in a CG, in accordance with various aspects of the present disclosure.

FIG. 6 is a diagram illustrating an example 600 associated with repetition in a CG, in accordance with various aspects of the present disclosure. In particular, the example 600 is an example of resources of a CG (e.g., resources of a CG resource) that the UE 120 may determine are to be used for transmission of repetitions of one or more transport blocks. In addition, the repetitions of the one or more transport blocks in the example 600 may be Type A PUSCH repetitions.

In the example 600, the configuration for the CG and/or the activation DCI may indicate a starting symbol (S) of 2, a length (L) value of 4, a quantity of repetitions (e.g., across consecutive slots) of 4, a quantity of consecutive PUSCH occasions per slot of 2, and a quantity of consecutive slots of 4 (which defines the CG resource). Moreover, the example 600 includes repetitions for a first transport block (TB 0) and a second transport block (TB 1). However, in some aspects, different values for S, L, the quantity of repetitions, the quantity of consecutive PUSCH occasions per slot, and/or the quantity of consecutive slots may be used, and a different quantity of transport blocks may be used.

In the example 600, transmission occasions of the CG may be based at least in part on the quantity of consecutive PUSCH occasions per slot, the quantity of consecutive slots, and a SLIV that is indicated for a first PUSCH occasion of the CG (e.g., the transmission occasions may be defined in accordance with Release 16 NR-U CG-UL enhancements, as described above). For example, in each slot, the transmission occasions may start after the indicated starting symbol (S=2, as shown), and each transmission occasion may have the indicated length (L=4, as shown). Moreover, the quantity of transmission occasions in a slot may correspond to the indicated quantity of consecutive PUSCH occasions per slot (2, as shown). Accordingly, the transmission occasions in a slot may be continuous and without time gaps.

In some aspects, the repetitions of the one or more transport blocks are transmitted in consecutive transmission occasions. In this case, a quantity of the transmission occasions used for repetitions of a single transport block may correspond to the quantity of repetitions across consecutive slots that is indicated for the CG. In other words, the quantity of repetitions across consecutive slots that is indicated for the CG may be reinterpreted as the quantity of repetitions across consecutive transmission occasions. For example, if the indicated quantity of repetitions is four, then repetitions of the first transport block (TB 0) may be in the first four consecutive transmission occasions of the CG resource, and repetitions of the second transport block (TB 1) may be in the second four consecutive transmission occasions of the CG resource. As described above, the indicated quantity of repetitions may be provided in the activation DCI (for a Type 2 CG), provided in the CG configuration (for a Type 1 CG), or provided by a default value (repK) if not provided in the activation DCI or the CG configuration.

In some aspects, a time gap (e.g., of one or more symbols) may separate a first set of continuous transmission occasions (e.g., without time gaps, in accordance with the quantity of consecutive PUSCH occasions per slot) in a first slot and a second set of continuous transmission occasions in a second slot. The first set of continuous transmission occasions and the second set of continuous transmission occasions may be used for repetitions of the same transport block or repetitions of different transport blocks. The base station 110 may determine a SLIV, or the like, that is suitable to provide a particular time gap. The UE may perform a listen-before-talk procedure (e.g., in a time gap) before transmission of each set of continuous transmission occasions (e.g., before each burst of repetitions).

As indicated above, FIG. 6 is provided as an example. Other examples may differ from what is described with respect to FIG. 6.

Figure 7A:
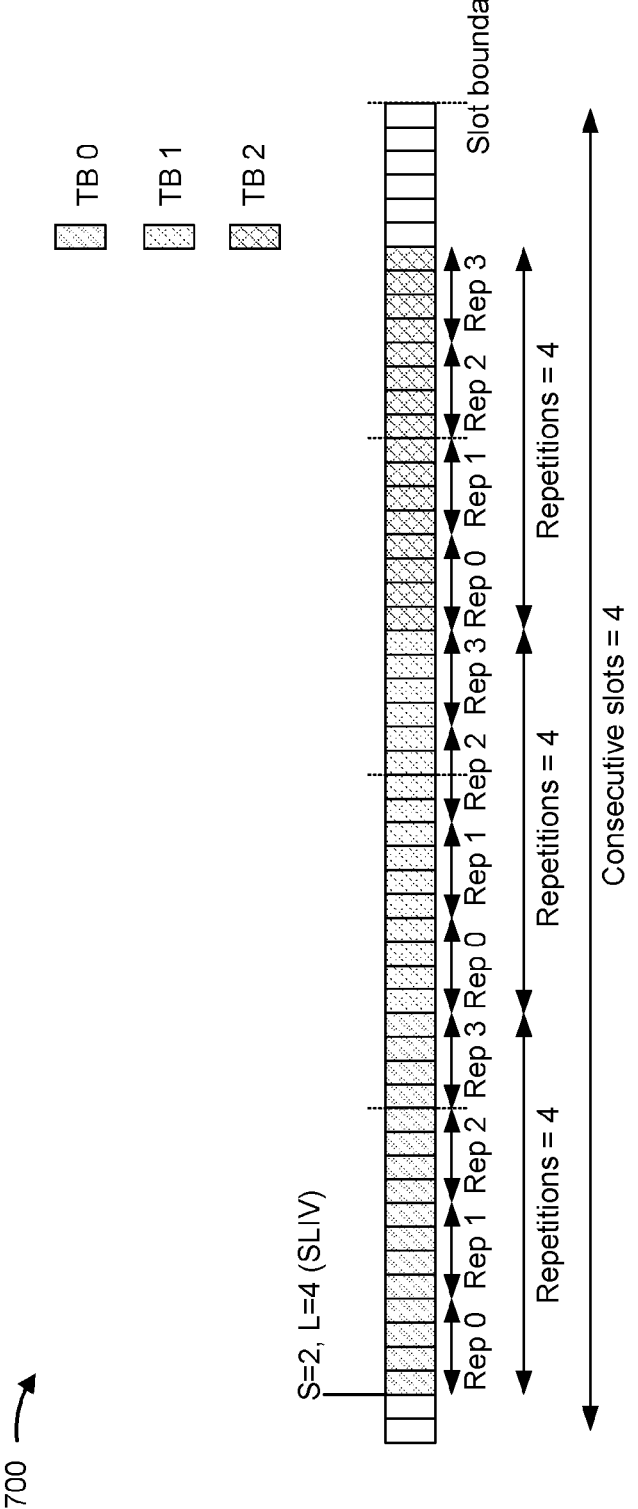
FIGS. 7A-7C are diagrams illustrating examples associated with repetition in a CG, in accordance with various aspects of the present disclosure.
Figure 7B:
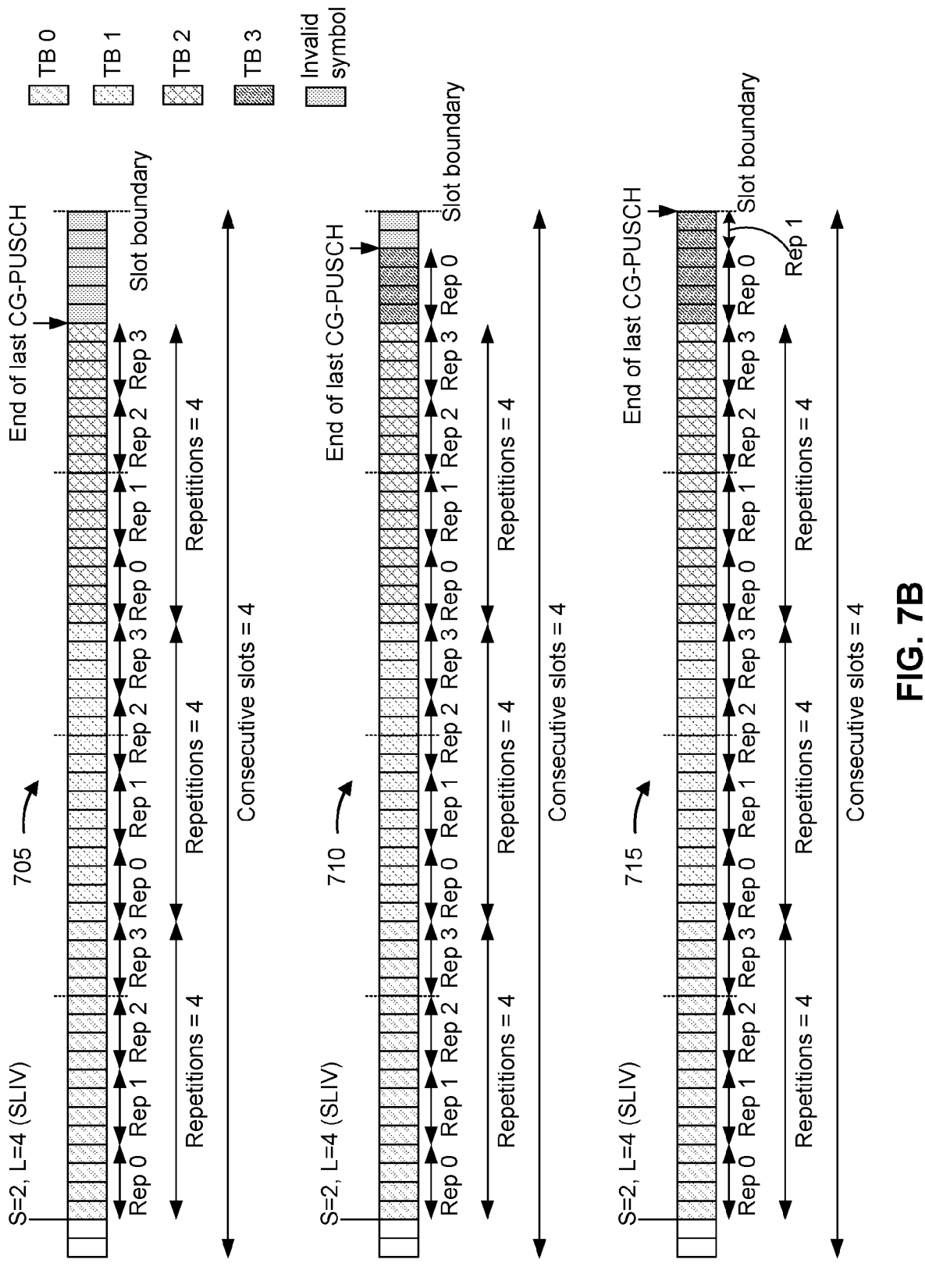
Figure 7C:
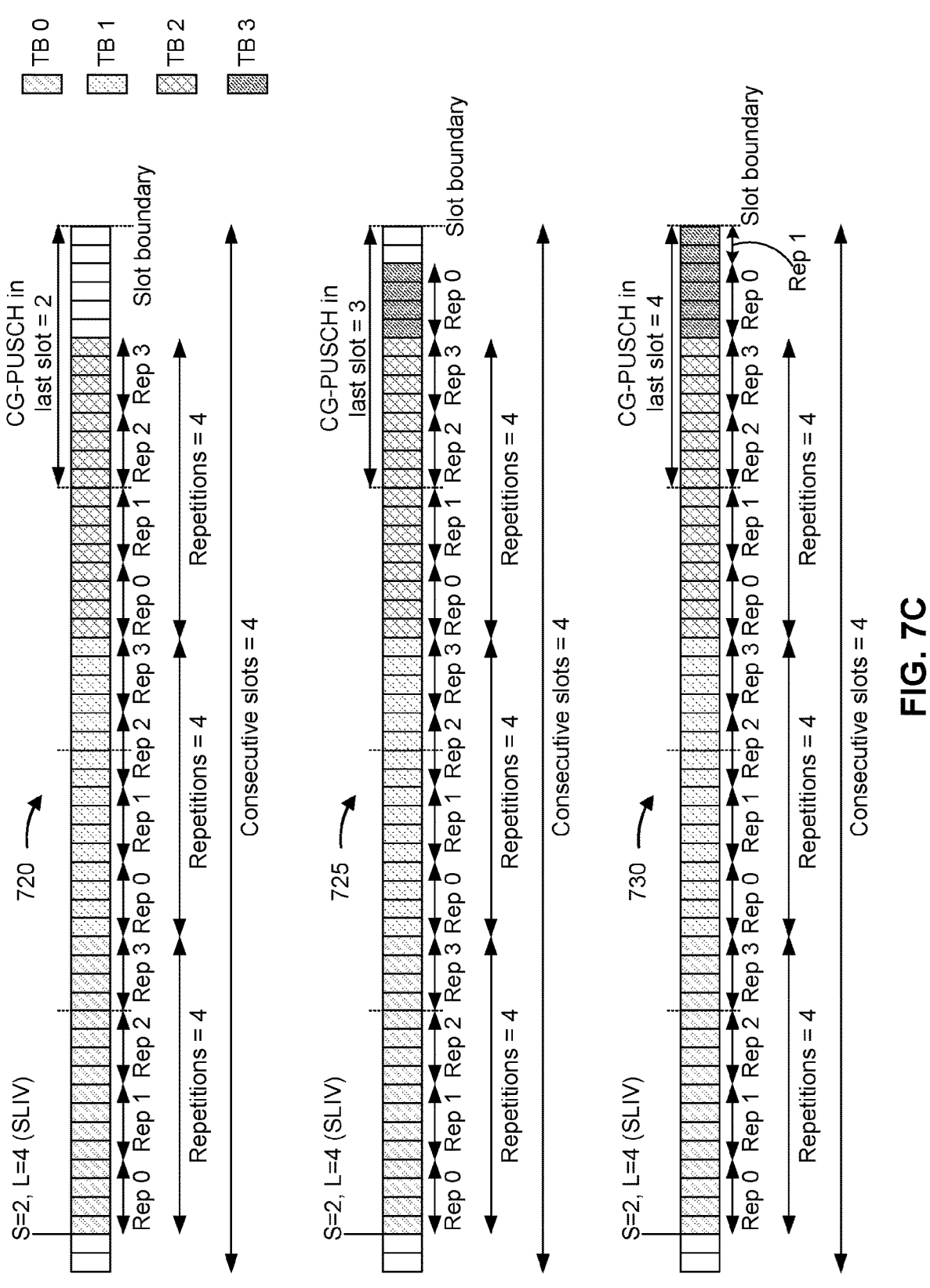

FIGS. 7A-7C are diagrams illustrating examples 700, 705, 710, 715, 720, 725, and 730 associated with repetition in a CG, in accordance with various aspects of the present disclosure. In particular, FIGS. 7A-7C show resources of a CG (e.g., resources of a CG resource) that the UE 120 may determine are to be used for transmission of repetitions of one or more transport blocks. In addition, the repetitions of the one or more transport blocks, shown in FIGS. 7A-7C, may be Type B PUSCH repetitions.

As shown in FIGS. 7A-7C, the configuration for the CG and/or the activation DCI may indicate a starting symbol (S) of 2, a length (L) value of 4, a quantity of repetitions (e.g., across consecutive nominal repetitions) of 4, and a quantity of consecutive slots of 4 (which defines the CG resource). Moreover, FIGS. 7A-7C show repetitions for a first transport block (TB 0), a second transport block (TB 1), a third transport block (TB 2), and/or a fourth transport block (TB 3). However, in some aspects, different values for S, L, the quantity of repetitions, and/or the quantity of consecutive slots may be used, and a different quantity of transport blocks may be used.

In the example 700, the repetitions of the one or more transport blocks may be without time gaps in the quantity of consecutive slots. For example, transmission occasions may start, in a first slot of the consecutive slots, after the indicated starting symbol (S=2, as shown), and each transmission occasion may have the indicated length (L=4, as shown). Thus, each transmission occasion/repetition may have a time duration and a mapping type (e.g., mapping Type A, mapping Type B, and/or the like) that is based at least in part on a SLIV (e.g., an L value) and a mapping type indicated for a first PUSCH occasion in a slot (e.g., indicated by the configuration for the CG or the activation DCI). The transmission occasions in the consecutive slots may be continuous and without time gaps, regardless of the indicated quantity of consecutive PUSCH occasions per slot. That is, each transmission occasion (e.g., PUSCH allocation) may be appended following a previous transmission occasion without time gaps and up to the indicated quantity of consecutive slots.

In some aspects, the repetitions of the one or more transport blocks are transmitted in consecutive transmission occasions, as described above. For example, if the indicated quantity of repetitions (e.g., across consecutive nominal repetitions) is four, then repetitions of the first transport block (TB 0) may be in the first four consecutive transmission occasions of the CG resource, repetitions of the second transport block (TB 1) may be in the second four consecutive transmission occasions of the CG resource, and repetitions of the third transport block (TB 2) may be in the third four consecutive transmission occasions of the CG resource. As described above, the indicated quantity of repetitions may be provided in the activation DCI (for a Type 2 CG), provided in the CG configuration (for a Type 1 CG), or provided by a default value (repK) if not provided in the activation DCI or the CG configuration.

In the example 700, the repetitions of the one or more transport blocks may end before an end of the CG (e.g., before an end of the CG resource). That is, after a complete set of repetitions (e.g., according to the indicated quantity of repetitions) of a transport block, the CG resource may include one or more symbols at the end of the CG resource that are insufficient for another complete set of repetitions of another transport block. The examples 705, 710, 715, 720, 725, and 730 are examples of techniques for determining resources that are to be used for a last transmission occasion of the CG.

In the example 705, a quantity of transmission occasions in the consecutive slots of the CG resource may be a multiple of the indicated quantity of repetitions for the CG (e.g., indicated by the activation DCI, the configuration for the CG, or the default value (repK)). For example, if the indicated quantity of repetitions is four, the CG resource may include 12 transmission occasions, as shown. In the example 705, time resources (e.g., one or more symbols) at an end of the CG resource, and following a previous transmission occasion/repetition, may be invalid for a transmission occasion if the time resources are insufficient for a time duration of a complete set of repetitions of a transport block. A time duration of a complete set of repetitions of a transport block may correspond to the indicated quantity of repetitions multiplied by the indicated length (L).

In the examples 710 and 715, transmission occasions of the CG may continue in time resources at an end of a last slot, of the consecutive slots of the CG resource, until the time resources are insufficient for a complete transmission occasion (e.g., according to the indicated length (L)). For example, the examples 710 and 715 include a repetition of the fourth transport block (TB 3) in a transmission occasion that follows a last repetition of the third transport block (TB 2). Thus, a transmission occasion may be in time resources (e.g., symbols), between a previous transmission occasion/repetition and an end of the CG resource, that are sufficient for a time duration of a transmission occasion/repetition (e.g., corresponding to the indicated length (L)). As a result, after a complete transmission occasion/repetition, the CG resource may include one or more symbols at the end of the CG resource that are insufficient for another complete transmission occasion/repetition.

In the example 710, in some aspects, time resources (e.g., one or more symbols), between a previous transmission occasion/repetition and an end of the CG resource, may be invalid for a transmission occasion if the time resources are insufficient for a time duration of a complete transmission occasion/repetition (e.g., according to the indicated length (L)). In the example 715, in some aspects, time resources (e.g., one or more symbols), between a previous transmission occasion/repetition and an end of the CG resource, may be valid for a transmission occasion (e.g., a partial transmission occasion) even if the time resources are insufficient for a time duration of a complete transmission occasion/repetition (e.g., according to the indicated length (L)). For example, the example 715 includes a second repetition of the fourth transport block (TB 3) in a partial transmission occasion that follows a first repetition of the fourth transport block (TB 3).

In this case, the time resources may be valid for the partial transmission occasion if the time resources have a duration (e.g., a quantity of symbols corresponding to the time resources) that satisfies a threshold value (X). That is, if the quantity of symbols at the end of the CG resource is greater than or equal to X OFDM symbols (and less than L), then the symbols may be valid for a partial transmission occasion, and if the quantity of symbols is less than X OFDM symbols, then the symbols may be invalid for a transmission occasion. In some aspects, X may have a fixed value that is statically configured. In some aspects, X may have a value that is a function of the time duration for a complete transmission occasion/repetition (e.g., according to the indicated length (L)). For example, X may correspond to floor(L÷2) or ceiling(L÷2).

In some aspects, a parameter of the configuration for the CG may indicate a quantity of transmission occasions (which may include a partial transmission occasion) for a last slot of the consecutive slots of the CG resource. For example, the parameter may be the quantity of PUSCH occasions per slot parameter, which may be reinterpreted to indicate the quantity of transmission occasions (which may include a partial transmission occasion) in the last slot. In some aspects, a new parameter to indicate the quantity of transmission occasions (which may include a partial transmission occasion) in the last slot may be defined for the configuration for the CG.

The example 720 is an example in which two transmission occasions are indicated for the last slot. In this example, repetitions for the same transport block (TB 2, as shown) may be in the two transmission occasions. The example 725 is an example in which three transmission occasions are indicated for the last slot. In this example, repetitions for a transport block (TB 2, as shown) may be in the first and second transmission occasions, and a repetition for another transport block (TB 3, as shown) may be in a third transmission occasion. The example 730 is an example in which four transmission occasions are indicated for the last slot. In this example, repetitions for a transport block (TB 2, as shown) may be in the first and second transmission occasions, and repetitions for another transport block (TB 3, as shown) may be in a third transmission occasion and a fourth partial transmission occasion.

As indicated above, FIGS. 7A-7C are provided as examples. Other examples may differ from what is described with respect to FIGS. 7A-7C.

Figure 8A:
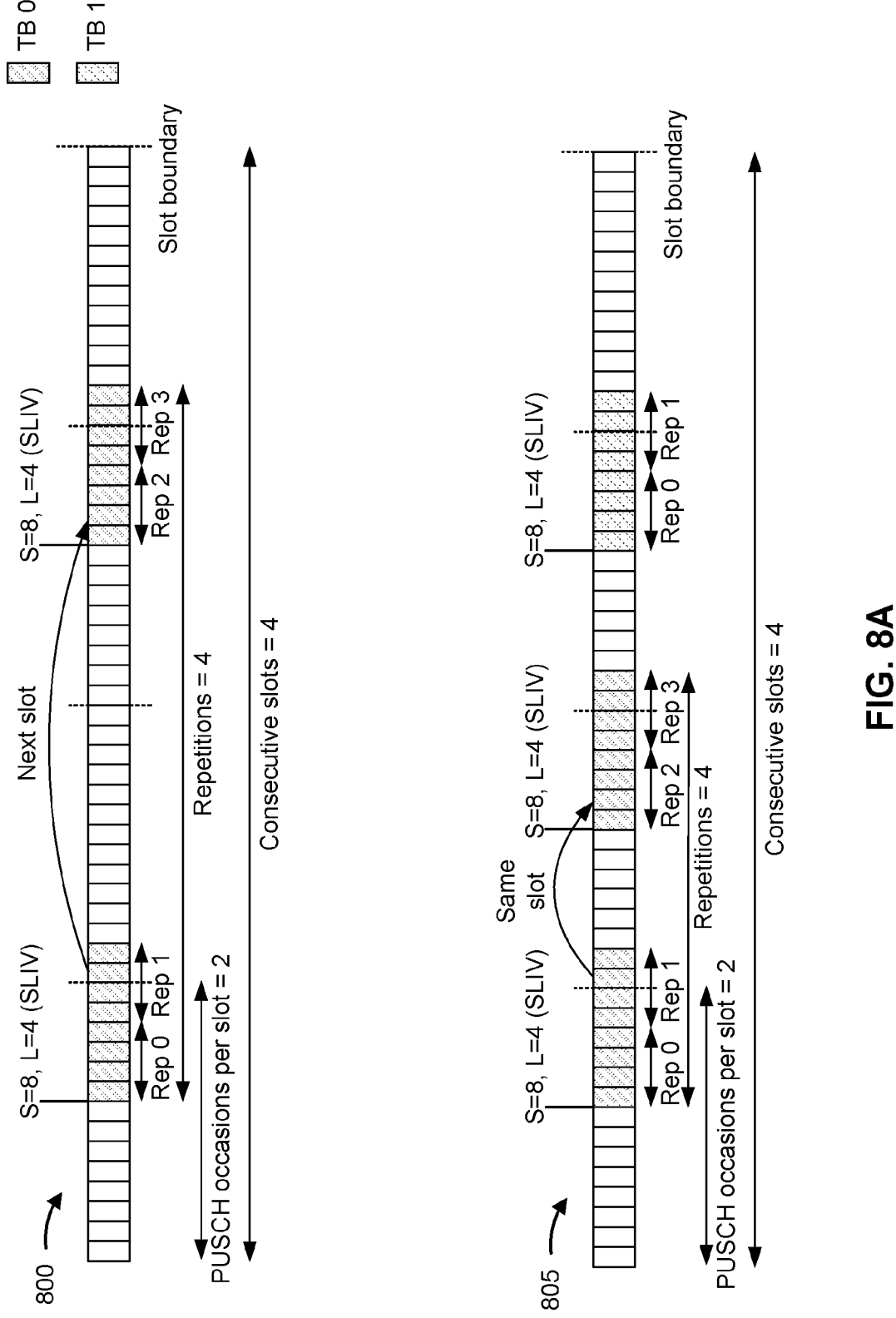
FIGS. 8A and 8B are diagrams illustrating examples associated with repetition in a CG, in accordance with various aspects of the present disclosure.
Figure 8B:
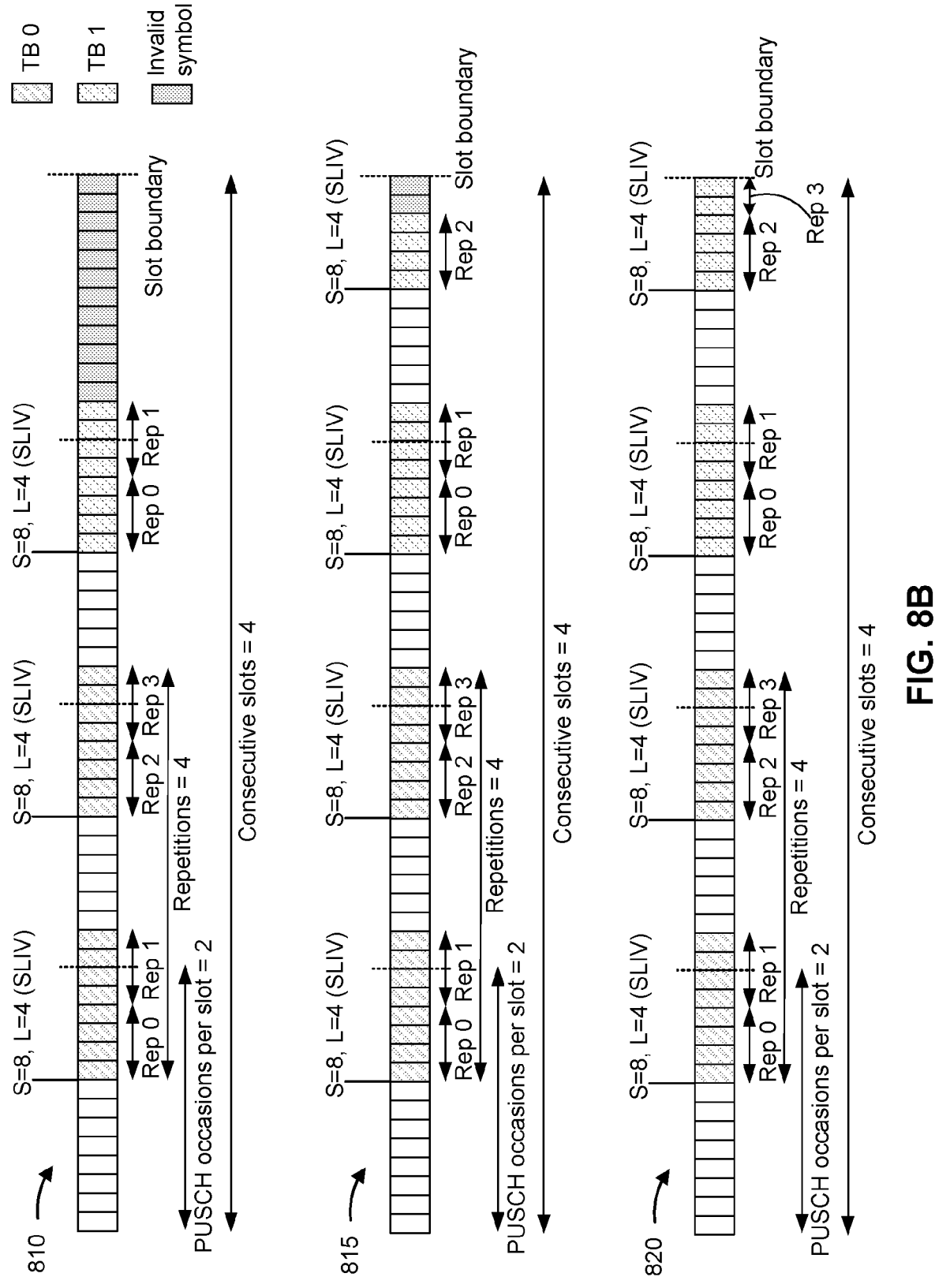

FIGS. 8A and 8B are diagrams illustrating examples 800, 805, 810, 815, and 820 associated with repetition in a CG, in accordance with various aspects of the present disclosure. In particular, FIGS. 8A and 8B show resources of a CG (e.g., resources of a CG resource) that the UE 120 may determine are to be used for transmission of repetitions of one or more transport blocks. In addition, the repetitions of the one or more transport blocks, shown in FIGS. 8A and 8B, may be Type B PUSCH repetitions.

As shown in FIGS. 8A and 8B, the configuration for the CG and/or the activation DCI may indicate a starting symbol (S) of 8, a length (L) value of 4, a quantity of repetitions (e.g., across consecutive nominal repetitions) of 4, a quantity of consecutive PUSCH occasions per slot of 2, and a quantity of consecutive slots of 4 (which defines the CG resource). Moreover, FIGS. 8A and 8B show repetitions for a first transport block (TB 0) and/or a second transport block (TB 1). However, in some aspects, different values for S, L, the quantity of repetitions, the quantity of consecutive PUSCH occasions per slot, and/or the quantity of consecutive slots may be used, and a different quantity of transport blocks may be used.

In the examples 800 and 805, the repetitions of the one or more transport blocks may be in the consecutive slots of the CG resource, and a set of continuous repetitions without time gaps may include a quantity of repetitions that does not exceed the indicated quantity of consecutive PUSCH occasions per slot. For example, a set of continuous transmission occasions may start, in a slot of the CG resource, after the indicated starting symbol (S=8, as shown), and each transmission occasion may have the indicated length (L=4, as shown). Thus, each transmission occasion/repetition may have a time duration and a mapping type that is based at least in part on a SLIV (e.g., an L value) and a mapping type indicated for a first PUSCH occasion in a slot (e.g., indicated by the configuration for the CG or the activation DCI). The transmission occasions may be continuous and without time gaps up to the indicated quantity of PUSCH occasions per slot. That is, each transmission occasion (e.g., PUSCH allocation) may be appended following a previous transmission occasion without time gaps and up to the indicated quantity of PUSCH occasions per slot.

In some aspects, the repetitions of the one or more transport blocks are transmitted in consecutive transmission occasions, as described above. For example, in the example 800, if the indicated quantity of repetitions (e.g., across consecutive nominal repetitions) is four, then repetitions of the first transport block (TB 0) may be in the first four consecutive transmission occasions of the CG resource. As another example, in the example 805, if the indicated quantity of repetitions (e.g., across consecutive nominal repetitions) is four, then repetitions of the first transport block (TB 0) may be in the first four consecutive transmission occasions of the CG resource, and repetitions of the second transport block (TB 1) may be in the remaining consecutive transmission occasions of the CG resource. As described above, the indicated quantity of repetitions may be provided in the activation DCI (for a Type 2 CG), provided in the CG configuration (for a Type 1 CG), or provided by a default value (repK) if not provided in the activation DCI or the CG configuration.

In some aspects, repetitions within a set of continuous transmission occasions may cross a slot boundary. That is, a set of repetitions without time gaps may be across multiple slots. For example, in the examples 800 and 805, a first set of continuous repetitions (e.g., without time gaps according to the indicated quantity of PUSCH occasions per slot) may begin after the starting symbol (S=8, as shown) in a first slot and end in a second slot (e.g., according to the length of the set of continuous repetitions, which is 8 symbols as shown).

In some aspects, a second set of continuous repetitions (e.g., without time gaps according to the indicated quantity of PUSCH occasions per slot) may begin in a slot that follows an end (e.g., an ending symbol) of the first set of continuous repetitions. For example, in the example 800, the first set of continuous repetitions crosses a slot boundary and ends in the second slot, and the second set of continuous repetitions begins in a third slot.

In some aspects, a second set of continuous repetitions (e.g., without time gaps according to the indicated quantity of PUSCH occasions per slot) may begin in the same slot as an end (e.g., an ending symbol) of the first set of continuous repetitions if a start (e.g., a starting symbol) of the second set of continuous repetitions is after the end of the first set of continuous repetitions. For example, in the example 805, the first set of continuous repetitions ends after symbol 2 in the second slot, and the second set of continuous repetitions begins after symbol 8 (e.g., according to the indicated SLIV for the CG) in the second slot. In some aspects, a second set of continuous repetitions (e.g., without time gaps according to the indicated quantity of PUSCH occasions per slot) may begin in a slot that follows an end (e.g., an ending symbol) of the first set of continuous repetitions if a start (e.g., a starting symbol) of the second set of continuous repetitions is before the end of the first set of continuous repetitions (e.g., in the slot in which the first set of continuous repetitions ends).

In the examples 800 and 805, the repetitions of the one or more transport blocks may end before an end of the CG (e.g., an end of the CG resource), as described above. The examples 810, 815, and 820 are examples of techniques for determining resources that are to be used for a last transmission occasion of the CG.

In the example 810, a quantity of transmission occasions in the consecutive slots of the CG resource may be a multiple of the indicated quantity of consecutive PUSCH occasions per slot (e.g., indicated by the configuration for the CG), in a manner similar to that described above in connection with the example 705 of FIG. 7B. For example, if the indicated quantity of consecutive PUSCH occasions per slot is two, the CG resource may include six transmission occasions, as shown.

In the examples 815 and 820, transmission occasions of the CG may continue in time resources at an end of a last slot, of the consecutive slots of the CG resource, until the time resources are insufficient for a complete transmission occasion (e.g., according to the indicated length (L)), as described above in connection with the examples 710 and 715 of FIG. 7B. For example, the examples 815 and 820 include a third repetition of the second transport block (TB 1) in a transmission occasion that follows a second repetition of the second transport block. Thus, a transmission occasion may be in time resources (e.g., symbols), between a previous transmission occasion/repetition and an end of the CG resource, that are sufficient for a time duration of a transmission occasion/repetition (e.g., corresponding to the indicated length (L)), as described above in connection with the examples 710 and 715 of FIG. 7B.

In the example 815, in some aspects, time resources (e.g., one or more symbols), between a previous transmission occasion/repetition and an end of the CG resource, may be invalid for a transmission occasion if the time resources are insufficient for a time duration of a transmission occasion/ repetition (e.g., according to the indicated length (L)), as described above in connection with the example 710 of FIG. 7B. In the example 820, in some aspects, time resources (e.g., one or more symbols), between a previous transmission occasion/repetition and an end of the CG resource, may be valid for a transmission occasion (e.g., a partial transmission occasion) even if the time resources are insufficient for a time duration of a complete transmission occasion/ repetition (e.g., according to the indicated length (L)), as described above in connection with the example 715 of FIG. 7B. In this case, the time resources may be valid for the partial transmission occasion if the time resources have a duration (e.g., a quantity of symbols corresponding to the time resources) that satisfies a threshold value (X), as described above in connection with the example 715 of FIG. 7B.

As indicated above, FIGS. 8A and 8B are provided as examples. Other examples may differ from what is described with respect to FIGS. 8A and 8B.

FIG. 9 is a diagram illustrating an example process 900 performed, for example, by a UE, in accordance with various aspects of the present disclosure. Example process 900 is an example where the UE (e.g., UE 120 and/or the like) performs operations associated with repetition in a configured grant.

As shown in FIG. 9, in some aspects, process 900 may include determining resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant (block 910). For example, the UE (e.g., using receive processor 258, transmit processor 264, controller/processor 280, memory 282, and/or the like) may determine resources of a configured grant that are to be used for transmitting repetitions of one or more transport blocks based at least in part on at least one of a quantity of consecutive slots indicated for the configured grant or a quantity of consecutive PUSCH occasions per slot indicated for the configured grant, as described above.

As further shown in FIG. 9, in some aspects, process 900 may include transmitting the repetitions of the one or more transport blocks in the determined resources of the configured grant (block 920). For example, the UE (e.g., using controller/processor 280, transmit processor 264, TX MIMO processor 266, MOD 254, antenna 252, and/or the like) may transmit the repetitions of the one or more transport blocks in the determined resources of the configured grant, as described above.

Process 900 may include additional aspects, such as any single aspect or any combination of aspects described below and/or in connection with one or more other processes described elsewhere herein.

In a first aspect, the configured grant is in an unlicensed frequency band.

In a second aspect, alone or in combination with the first aspect, a quantity of consecutive transmission occasions of the configured grant that are to be used for the repetitions of a transport block, of the one or more transport blocks, is based at least in part on a quantity of repetitions indicated for the configured grant by downlink control information activating the configured grant, a configuration for the configured grant, or another configuration.

In a third aspect, alone or in combination with one or more of the first and second aspects, the repetitions of the one or more transport blocks are transmitted in consecutive transmission occasions of the configured grant, and a quantity of the consecutive transmission occasions used for the repetitions of a transport block, of the one or more transport blocks, corresponds to a quantity of repetitions that is indicated for consecutive slots or for consecutive nominal repetitions of the configured grant.

In a fourth aspect, alone or in combination with one or more of the first through third aspects, transmission occasions of the configured grant are based at least in part on the quantity of consecutive PUSCH occasions per slot, the quantity of consecutive slots, and a start and length indicator value that is indicated for a first transmission occasion of a slot.

In a fifth aspect, alone or in combination with one or more of the first through fourth aspects, the repetitions of the one or more transport blocks are transmitted without time gaps in the quantity of consecutive slots.

In a sixth aspect, alone or in combination with one or more of the first through fifth aspects, the repetitions of the one or more transport blocks are transmitted without time gaps regardless of the quantity of consecutive PUSCH occasions per slot.

In a seventh aspect, alone or in combination with one or more of the first through sixth aspects, the repetitions of the one or more transport blocks are transmitted in the quantity of consecutive slots, and a set of the repetitions that are transmitted without time gaps includes a quantity of repetitions that does not exceed the quantity of consecutive PUSCH occasions per slot.

In an eighth aspect, alone or in combination with one or more of the first through seventh aspects, the set of the repetitions that are transmitted without time gaps are transmitted across multiple slots.

In a ninth aspect, alone or in combination with one or more of the first through eighth aspects, another set of the repetitions are transmitted without time gaps in a slot that follows an ending symbol of the set of the repetitions.

In a tenth aspect, alone or in combination with one or more of the first through ninth aspects, another set of the repetitions are transmitted without time gaps in a same slot as an ending symbol of the set of the repetitions if a starting symbol of the other set of the repetitions is after the ending symbol.

In an eleventh aspect, alone or in combination with one or more of the first through tenth aspects, another set of the repetitions are transmitted without time gaps in a slot that follows an ending symbol of the set of the repetitions if a starting symbol of the other set of the repetitions is before the ending symbol.

In a twelfth aspect, alone or in combination with one or more of the first through eleventh aspects, a repetition, of the repetitions, has a time duration and a mapping type that is based at least in part on a start and length indicator value and a mapping type indicated for a first transmission occasion of a slot.

In a thirteenth aspect, alone or in combination with one or more of the first through twelfth aspects, a quantity of transmission occasions in the quantity of consecutive slots is a multiple of a quantity of repetitions indicated for the configured grant.

In a fourteenth aspect, alone or in combination with one or more of the first through thirteenth aspects, a quantity of transmission occasions in the quantity of consecutive slots is a multiple of the quantity of consecutive PUSCH occasions per slot.

In a fifteenth aspect, alone or in combination with one or more of the first through fourteenth aspects, time resources at an end of the configured grant are invalid for a transmission occasion if the time resources are insufficient for a time duration of the repetitions of a transport block of the one or more transport blocks.

In a sixteenth aspect, alone or in combination with one or more of the first through fifteenth aspects, one or more transmission occasions of the configured grant are in time resources at an end of the configured grant that are sufficient for a time duration of a repetition.

In a seventeenth aspect, alone or in combination with one or more of the first through sixteenth aspects, time resources at an end of the configured grant are invalid for a transmission occasion if the time resources are insufficient for a time duration of a repetition.

In an eighteenth aspect, alone or in combination with one or more of the first through seventeenth aspects, time resources at an end of the configured grant, that are insufficient for a time duration of a repetition, are valid for a transmission occasion if the time resources have a duration that satisfies a threshold value.

In a nineteenth aspect, alone or in combination with one or more of the first through eighteenth aspects, a configuration for the configured grant indicates a quantity of transmission occasions for a last slot of the quantity of consecutive slots.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with repetition in a configured grant.

As shown in FIG. 10, in some aspects, process 1000 may include determining resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant (block 1010). For example, the base station (e.g., using transmit processor 220, receive processor 238, controller/processor 240, memory 242, and/or the like) may determine resources of a configured grant for a UE that the UE is to use for transmitting repetitions of one or more transport blocks based at least in part on at least one of a quantity of consecutive slots indicated for the configured grant or a quantity of consecutive PUSCH occasions per slot indicated for the configured grant, as described above.

As further shown in FIG. 10, in some aspects, process 1000 may include receiving the repetitions of the one or more transport blocks in the determined resources of the configured grant (block 1020). For example, the base station (e.g., using antenna 234, DEMOD 232, MIMO detector 236, receive processor 238, controller/processor 240, and/or the like) may receive the repetitions of the one or more transport blocks in the determined resources of the configured grant, as described above.

Process 1000 may include additional aspects, such as any single aspect or any combination of aspects described below and/or in connection with one or more other processes described elsewhere herein.

In a first aspect, the configured grant is in an unlicensed frequency band.

In a second aspect, alone or in combination with the first aspect, a quantity of consecutive transmission occasions of the configured grant that are to be used for the repetitions of a transport block, of the one or more transport blocks, is based at least in part on a quantity of repetitions indicated for the configured grant by downlink control information activating the configured grant, a configuration for the configured grant, or another configuration.

In a third aspect, alone or in combination with one or more of the first and second aspects, the repetitions of the one or more transport blocks are received in consecutive transmission occasions of the configured grant, and a quantity of the consecutive transmission occasions used for the repetitions of a transport block, of the one or more transport blocks, corresponds to a quantity of repetitions that is indicated for consecutive slots or for consecutive nominal repetitions of the configured grant.

In a fourth aspect, alone or in combination with one or more of the first through third aspects, transmission occasions of the configured grant are based at least in part on the quantity of consecutive PUSCH occasions per slot, the quantity of consecutive slots, and a start and length indicator value that is indicated for a first transmission occasion of a slot.

In a fifth aspect, alone or in combination with one or more of the first through fourth aspects, the repetitions of the one or more transport blocks are received without time gaps in the quantity of consecutive slots.

In a sixth aspect, alone or in combination with one or more of the first through fifth aspects, the repetitions of the one or more transport blocks are received without time gaps regardless of the quantity of consecutive PUSCH occasions per slot.

In a seventh aspect, alone or in combination with one or more of the first through sixth aspects, the repetitions of the one or more transport blocks are received in the quantity of consecutive slots, and a set of the repetitions that are received without time gaps includes a quantity of repetitions that does not exceed the quantity of consecutive PUSCH occasions per slot.

In an eighth aspect, alone or in combination with one or more of the first through seventh aspects, the set of the repetitions that are received without time gaps are received across multiple slots.

In a ninth aspect, alone or in combination with one or more of the first through eighth aspects, another set of the repetitions are received without time gaps in a slot that follows an ending symbol of the set of the repetitions.

In a tenth aspect, alone or in combination with one or more of the first through ninth aspects, another set of the repetitions are received without time gaps in a same slot as an ending symbol of the set of the repetitions if a starting symbol of the other set of the repetitions is after the ending symbol.

In an eleventh aspect, alone or in combination with one or more of the first through tenth aspects, another set of the repetitions are received without time gaps in a slot that follows an ending symbol of the set of the repetitions if a starting symbol of the other set of the repetitions is before the ending symbol.

In a twelfth aspect, alone or in combination with one or more of the first through eleventh aspects, a repetition, of the repetitions, has a time duration and a mapping type that is based at least in part on a start and length indicator value and a mapping type indicated for a first transmission occasion of a slot.

In a thirteenth aspect, alone or in combination with one or more of the first through twelfth aspects, a quantity of transmission occasions in the quantity of consecutive slots is a multiple of a quantity of repetitions indicated for the configured grant.

In a fourteenth aspect, alone or in combination with one or more of the first through thirteenth aspects, a quantity of transmission occasions in the quantity of consecutive slots is a multiple of the quantity of consecutive PUSCH occasions per slot.

In a fifteenth aspect, alone or in combination with one or more of the first through fourteenth aspects, time resources at an end of the configured grant are invalid for a transmission occasion if the time resources are insufficient for a time duration of the repetitions of a transport block of the one or more transport blocks.

In a sixteenth aspect, alone or in combination with one or more of the first through fifteenth aspects, one or more transmission occasions of the configured grant are in time resources at an end of the configured grant that are sufficient for a time duration of a repetition.

In a seventeenth aspect, alone or in combination with one or more of the first through sixteenth aspects, time resources at an end of the configured grant are invalid for a transmission occasion if the time resources are insufficient for a time duration of a repetition.

In an eighteenth aspect, alone or in combination with one or more of the first through seventeenth aspects, time resources at an end of the configured grant, that are insufficient for a time duration of a repetition, are valid for a transmission occasion if the time resources have a duration that satisfies a threshold value.

In a nineteenth aspect, alone or in combination with one or more of the first through eighteenth aspects, a configuration for the configured grant indicates a quantity of transmission occasions for a last slot of the quantity of consecutive slots.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving a configuration for a configured grant, wherein the configuration for the configured grant indicates a quantity of consecutive slots and a quantity of consecutive physical uplink shared channel (PUSCH) occasions per slot of the configured grant;

determining resources of the configured grant that are to be used for transmitting repetitions of one or more transport blocks based at least in part on at least one of the quantity of consecutive slots indicated for the configured grant or the quantity of consecutive PUSCH occasions per slot indicated for the configured grant; and transmitting the repetitions of the one or more transport blocks in the determined resources of the configured grant, wherein the repetitions of the one or more transport blocks are transmitted in the quantity of consecutive slots, and a set of the repetitions that are transmitted without time gaps includes a quantity of repetitions that does not exceed the quantity of consecutive PUSCH occasions per slot, and wherein another set of the repetitions are transmitted without time gaps in a slot that follows an ending symbol of the set of the repetitions if a starting symbol of the other set of the repetitions is before the ending symbol.

2. The method of claim 1, wherein the configured grant is in an unlicensed frequency band.

3. The method of claim 1, wherein a quantity of consecutive transmission occasions of the configured grant that are to be used for the repetitions of a transport block, of the one or more transport blocks, is based at least in part on the quantity of repetitions indicated for the configured grant by downlink control information activating the configured grant, the configuration for the configured grant, or another configuration.

4. The method of claim 1, wherein the repetitions of the one or more transport blocks are transmitted in consecutive transmission occasions of the configured grant, and wherein a quantity of the consecutive transmission occasions used for the repetitions of a transport block, of the one or more transport blocks, corresponds to the quantity of repetitions that is indicated for consecutive slots or for consecutive nominal repetitions of the configured grant.

5. The method of claim 1, wherein transmission occasions of the configured grant are based at least in part on the quantity of consecutive PUSCH occasions per slot, the quantity of consecutive slots, and a start and length indicator value that is indicated for a first transmission occasion of a slot.

6. The method of claim 1, wherein the repetitions of the one or more transport blocks are transmitted without time gaps in the quantity of consecutive slots.

7. The method of claim 6, wherein the repetitions of the one or more transport blocks are transmitted without time gaps regardless of the quantity of consecutive PUSCH occasions per slot.

8. The method of claim 1, wherein the set of the repetitions that are transmitted without time gaps are transmitted across multiple slots.

9. The method of claim 1, wherein a repetition, of the repetitions, has a time duration and a mapping type that is based at least in part on a start and length indicator value and a mapping type indicated for a first transmission occasion of a slot.

10. The method of claim 1, wherein a quantity of transmission occasions in the quantity of consecutive slots is a multiple of the quantity of repetitions indicated for the configured grant.

11. The method of claim 1, wherein a quantity of transmission occasions in the quantity of consecutive slots is a multiple of the quantity of consecutive PUSCH occasions per slot.

12. The method of claim 1, wherein time resources at an end of the configured grant are invalid for a transmission occasion if the time resources are insufficient for a time duration of the repetitions of a transport block of the one or more transport blocks.

13. The method of claim 1, wherein one or more transmission occasions of the configured grant are in time resources at an end of the configured grant that are sufficient for a time duration of a repetition.

14. The method of claim 1, wherein time resources at an end of the configured grant are invalid for a transmission occasion if the time resources are insufficient for a time duration of a repetition.

15. The method of claim 1, wherein time resources at an end of the configured grant, that are insufficient for a time duration of a repetition, are valid for a transmission occasion if the time resources have a duration that satisfies a threshold value.

16. The method of claim 1, wherein the configuration for the configured grant indicates a quantity of transmission occasions for a last slot of the quantity of consecutive slots.

17. A method of wireless communication performed by a base station, comprising:

transmitting a configuration for a configured grant, wherein the configuration for the configured grant indicates a quantity of consecutive slots and a quantity of consecutive physical uplink shared channel (PUSCH) occasions per slot of the configured grant;

determining resources of the configured grant for a user equipment (UE) that the UE is to use for transmitting repetitions of one or more transport blocks based at least in part on at least one of the quantity of consecutive slots indicated for the configured grant or the quantity of consecutive PUSCH occasions per slot indicated for the configured grant; and receiving the repetitions of the one or more transport blocks in the determined resources of the configured grant, wherein the repetitions of the one or more transport blocks are received in the quantity of consecutive slots, and a set of the repetitions that are received without time gaps includes a quantity of repetitions that does not exceed the quantity of consecutive PUSCH occasions per slot, and wherein another set of the repetitions are received without time gaps in a slot that follows an ending symbol of the set of the repetitions if a starting symbol of the other set of the repetitions is before the ending symbol.

18. The method of claim 17, wherein the configured grant is in an unlicensed frequency band.

19. The method of claim 17, wherein a quantity of consecutive transmission occasions of the configured grant that are to be used for the repetitions of a transport block, of the one or more transport blocks, is based at least in part on the quantity of repetitions indicated for the configured grant by downlink control information activating the configured grant, the configuration for the configured grant, or another configuration.

20. The method of claim 17, wherein the repetitions of the one or more transport blocks are received in consecutive transmission occasions of the configured grant, and wherein a quantity of the consecutive transmission occasions used for the repetitions of a transport block, of the one or more transport blocks, corresponds to the quantity of repetitions that is indicated for consecutive slots or for consecutive nominal repetitions of the configured grant.

21. The method of claim 17, wherein transmission occasions of the configured grant are based at least in part on the quantity of consecutive PUSCH occasions per slot, the quantity of consecutive slots, and a start and length indicator value that is indicated for a first transmission occasion of a slot.

22. The method of claim 17, wherein the repetitions of the one or more transport blocks are received without time gaps in the quantity of consecutive slots.

23. The method of claim 22, wherein the repetitions of the one or more transport blocks are received without time gaps regardless of the quantity of consecutive PUSCH occasions per slot.

24. The method of claim 17, wherein the set of the repetitions that are received without time gaps are received across multiple slots.

25. The method of claim 17, wherein a repetition, of the repetitions, has a time duration and a mapping type that is based at least in part on a start and length indicator value and a mapping type indicated for a first transmission occasion of a slot.

26. The method of claim 17, wherein a quantity of transmission occasions in the quantity of consecutive slots is a multiple of the quantity of repetitions indicated for the configured grant.

27. The method of claim 17, wherein a quantity of transmission occasions in the quantity of consecutive slots is a multiple of the quantity of consecutive PUSCH occasions per slot.

28. The method of claim 17, wherein time resources at an end of the configured grant are invalid for a transmission occasion if the time resources are insufficient for a time duration of the repetitions of a transport block of the one or more transport blocks.

29. The method of claim 17, wherein one or more transmission occasions of the configured grant are in time resources at an end of the configured grant that are sufficient for a time duration of a repetition.

30. The method of claim 17, wherein time resources at an end of the configured grant are invalid for a transmission occasion if the time resources are insufficient for a time duration of a repetition.

31. The method of claim 17, wherein time resources at an end of the configured grant, that are insufficient for a time duration of a repetition, are valid for a transmission occasion if the time resources have a duration that satisfies a threshold value.

32. A user equipment (UE) for wireless communication, comprising:

a memory; and one or more processors operatively coupled to the memory, the memory and the one or more processors configured to:

receive a configuration for a configured grant, wherein the configuration for the configured grant indicates a quantity of consecutive slots and a quantity of consecutive physical uplink shared channel (PUSCH) occasions per slot of the configured grant;

determine resources of the configured grant that are to be used for transmitting repetitions of one or more transport blocks based at least in part on at least one of the quantity of consecutive slots indicated for the configured grant or the quantity of consecutive PUSCH occasions per slot indicated for the configured grant; and transmit the repetitions of the one or more transport blocks in the determined resources of the configured grant, wherein the repetitions of the one or more transport blocks are configured to be transmitted in the quantity of consecutive slots, and a set of the repetitions that are configured to be transmitted without time gaps includes a quantity of repetitions that does not exceed the quantity of consecutive PUSCH occasions per slot, and wherein another set of the repetitions are configured to be transmitted without time gaps in a slot that follows an ending symbol of the set of the repetitions if a starting symbol of the other set of the repetitions is before the ending symbol.

33. The UE of claim 32, wherein the configured grant is in an unlicensed frequency band.

34. The UE of claim 32, wherein a quantity of consecutive transmission occasions of the configured grant that are to be used for the repetitions of a transport block, of the one or more transport blocks, is based at least in part on the quantity of repetitions indicated for the configured grant by downlink control information activating the configured grant, the configuration for the configured grant, or another configuration.

35. The UE of claim 32, wherein the repetitions of the one or more transport blocks are configured to be transmitted in consecutive transmission occasions of the configured grant, and wherein a quantity of the consecutive transmission occasions used for the repetitions of a transport block, of the one or more transport blocks, corresponds to the quantity of repetitions that is indicated for consecutive slots or for consecutive nominal repetitions of the configured grant.

36. The UE of claim 32, wherein transmission occasions of the configured grant are based at least in part on the quantity of consecutive PUSCH occasions per slot, the quantity of consecutive slots, and a start and length indicator value that is indicated for a first transmission occasion of a slot.

37. A base station for wireless communication, comprising:
    a memory; and
    one or more processors operatively coupled to the memory, the memory and the one or more processors configured to:
        transmit a configuration for a configured grant, wherein the configuration for the configured grant indicates a quantity of consecutive slots and a quantity of consecutive physical uplink shared channel (PUSCH) occasions per slot of the configured grant;
        determine resources of the configured grant for a user equipment (UE) that the UE is to use for transmitting repetitions of one or more transport blocks based at least in part on at least one of the quantity of consecutive slots indicated for the configured grant or the quantity of consecutive PUSCH occasions per slot indicated for the configured grant; and
    receive the repetitions of the one or more transport blocks in the determined resources of the configured grant, wherein the repetitions of the one or more transport blocks are configured to be received in the quantity of consecutive slots, and a set of the repetitions that are configured to be received without time gaps includes a quantity of repetitions that does not exceed the quantity of consecutive PUSCH occasions per slot, and wherein another set of the repetitions are configured to be received without time gaps in a slot that follows an ending symbol of the set of the repetitions if a starting symbol of the other set of the repetitions is before the ending symbol.

38. The base station of claim 37, wherein the configured grant is in an unlicensed frequency band.

39. The base station of claim 37, wherein a quantity of consecutive transmission occasions of the configured grant that are to be used for the repetitions of a transport block, of the one or more transport blocks, is based at least in part on the quantity of repetitions indicated for the configured grant by downlink control information activating the configured grant, the configuration for the configured grant, or another configuration.

40. The base station of claim 37, wherein the repetitions of the one or more transport blocks are configured to be received in consecutive transmission occasions of the configured grant, and wherein a quantity of the consecutive transmission occasions used for the repetitions of a transport block, of the one or more transport blocks, corresponds to the quantity of repetitions that is indicated for consecutive slots or for consecutive nominal repetitions of the configured grant.

41. The base station of claim 37, wherein transmission occasions of the configured grant are based at least in part on the quantity of consecutive PUSCH occasions per slot, the quantity of consecutive slots, and a start and length indicator value that is indicated for a first transmission occasion of a slot.

42. A non-transitory computer-readable medium storing a set of instructions for wireless communication, the set of instructions comprising:
    one or more instructions that, when executed by one or more processors of a user equipment (UE), cause the UE to:
        receive a configuration for a configured grant, wherein the configuration for the configured grant indicates a quantity of consecutive slots and a quantity of consecutive physical uplink shared channel (PUSCH) occasions per slot of the configured grant;
        determine resources of the configured grant that are to be used for transmitting repetitions of one or more transport blocks based at least in part on at least one of the quantity of consecutive slots indicated for the configured grant or the quantity of consecutive PUSCH occasions per slot indicated for the configured grant; and
        transmit the repetitions of the one or more transport blocks in the determined resources of the configured grant, wherein the repetitions of the one or more transport blocks are configured to be transmitted in the quantity of consecutive slots, and a set of the repetitions that are configured to be transmitted without time gaps includes a quantity of repetitions that does not exceed the quantity of consecutive PUSCH occasions per slot, and wherein another set of the repetitions are configured to be transmitted without time gaps in a slot that follows an ending symbol of the set of the repetitions if a starting symbol of the other set of the repetitions is before the ending symbol.

43. A non-transitory computer-readable medium storing a set of instructions for wireless communication, the set of instructions comprising:
    one or more instructions that, when executed by one or more processors of a base station, cause the base station to:
        transmit a configuration for a configured grant, wherein the configuration for the configured grant indicates a quantity of consecutive slots and a quantity of consecutive physical uplink shared channel (PUSCH) occasions per slot of the configured grant;
        determine resources of the configured grant for a user equipment (UE) that the UE is to use for transmitting repetitions of one or more transport blocks based at least in part on at least one of the quantity of consecutive slots indicated for the configured grant or the quantity of consecutive PUSCH occasions per slot indicated for the configured grant; and receive the repetitions of the one or more transport blocks in the determined resources of the configured grant, wherein the repetitions of the one or more transport blocks are configured to be received in the quantity of consecutive slots, and a set of the repetitions that are configured to be received without time gaps includes a quantity of repetitions that does not exceed the quantity of consecutive PUSCH occasions per slot, and wherein another set of the repetitions are configured to be received without time gaps in a slot that follows an ending symbol of the set of the repetitions if a starting symbol of the other set of the repetitions is before the ending symbol.

44. An apparatus for wireless communication, comprising:

means for receiving a configuration for a configured grant, wherein the configuration for the configured grant indicates a quantity of consecutive slots and a quantity of consecutive physical uplink shared channel (PUSCH) occasions per slot of the configured grant;

means for determining resources of the configured grant that are to be used for transmitting repetitions of one or more transport blocks based at least in part on at least one of the quantity of consecutive slots indicated for the configured grant or the quantity of consecutive PUSCH occasions per slot indicated for the configured grant; and means for transmitting the repetitions of the one or more transport blocks in the determined resources of the configured grant, wherein the repetitions of the one or more transport blocks are configured to be transmitted in the quantity of consecutive slots, and a set of the repetitions that are configured to be transmitted without time gaps includes a quantity of repetitions that does not exceed the quantity of consecutive PUSCH occasions per slot, and wherein another set of the repetitions are configured to be transmitted without time gaps in a slot that follows an ending symbol of the set of the repetitions if a starting symbol of the other set of the repetitions is before the ending symbol.

45. An apparatus for wireless communication, comprising:

means for transmitting a configuration for a configured grant, wherein the configuration for the configured grant indicates a quantity of consecutive slots and a quantity of consecutive physical uplink shared channel (PUSCH) occasions per slot of the configured grant;

means for determining resources of the configured grant for a user equipment (UE) that the UE is to use for transmitting repetitions of one or more transport blocks based at least in part on at least one of the quantity of consecutive slots indicated for the configured grant or the quantity of consecutive PUSCH occasions per slot indicated for the configured grant; and means for receiving the repetitions of the one or more transport blocks in the determined resources of the configured grant, wherein the repetitions of the one or more transport blocks are configured to be received in the quantity of consecutive slots, and a set of the repetitions that are configured to be received without time gaps includes a quantity of repetitions that does not exceed the quantity of consecutive PUSCH occasions per slot, and wherein another set of the repetitions are configured to be received without time gaps in a slot that follows an ending symbol of the set of the repetitions if a starting symbol of the other set of the repetitions is before the ending symbol.

46. The method of claim 17, wherein the configuration for the configured grant indicates a quantity of transmission occasions for a last slot of the quantity of consecutive slots.

\* \* \* \* \*